(12) United States Patent
Li et al.

(10) Patent No.: US 11,095,222 B2
(45) Date of Patent: Aug. 17, 2021

(54) HIGH EFFICIENCY CONVERTER

(71) Applicant: MediaTek Inc., Hsin-Chu (TW)

(72) Inventors: Chih-Chen Li, Taichung (TW);
Yen-Hsun Hsu, Hsinchu County (TW);
Tzu-Chi Huang, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/962,910

(22) Filed: Apr. 25, 2018

(65) Prior Publication Data
US 2019/0089252 A1 Mar. 21, 2019

Related U.S. Application Data

(60) Provisional application No. 62/561,222, filed on Sep. 21, 2017.

(51) Int. Cl.
*H02M 3/158* (2006.01)
*H02M 1/084* (2006.01)
*H02M 1/00* (2006.01)
*H02M 3/156* (2006.01)

(52) U.S. Cl.
CPC ......... *H02M 3/1584* (2013.01); *H02M 1/084* (2013.01); *H02M 3/158* (2013.01); *H02M 2001/0032* (2013.01); *H02M 2001/0048* (2013.01); *H02M 2001/0054* (2013.01); *H02M 2003/1566* (2013.01)

(58) Field of Classification Search
CPC ....... H02M 3/1584; H02M 2001/0032; H02M 2001/0048; H02M 2001/0054; H02M 2003/1566; H02M 1/084
See application file for complete search history.

(56) References Cited

U.S. PATENT DOCUMENTS

| | | | | |
|---|---|---|---|---|
| 6,897,715 B2* | 5/2005 | Barber, Jr. | ................ | G05F 1/56 |
| | | | | 323/316 |
| 7,498,694 B2* | 3/2009 | Luo | ........................ | H02M 1/10 |
| | | | | 307/82 |
| 7,541,784 B2* | 6/2009 | Davis | ...................... | H02P 9/007 |
| | | | | 320/123 |
| 9,654,007 B1 | 5/2017 | Childs | | |

(Continued)

FOREIGN PATENT DOCUMENTS

| CN | 101136591 A | 3/2008 |
|---|---|---|
| CN | 102739065 A | 10/2012 |

(Continued)

*Primary Examiner* — Lincoln D Donovan
*Assistant Examiner* — Colleen J O Toole
(74) *Attorney, Agent, or Firm* — Wolf, Greenfield & Sacks, P.C.

(57) ABSTRACT

A high efficiency converter is provided. The converter can be used in applications requiring fast transient response under a first loading condition, and high efficiency under a second loading condition. The converter converts one or more input voltages via two or more conversion paths. Each of the two or more conversion paths corresponds to a different loading condition which indicates a magnitude of a load driven by the converter (e.g., heavy or light), and a target transient response of the load (e.g., fast or slow). A conversion path for a heavy or fast loading condition converts an input voltage directly to a target output voltage. A conversion path for a light or slow loading condition includes a two-stage architecture.

22 Claims, 6 Drawing Sheets

(56) References Cited

U.S. PATENT DOCUMENTS

| | | | |
|---|---|---|---|
| 10,361,659 B2* | 7/2019 | Henzler | H03F 1/0227 |
| 2011/0101938 A1* | 5/2011 | Ma | H02M 3/07 |
| | | | 323/282 |
| 2016/0229303 A1 | 8/2016 | Kung | |
| 2016/0233712 A1* | 8/2016 | Kung | H02J 7/0072 |

FOREIGN PATENT DOCUMENTS

| | | |
|---|---|---|
| CN | 104052275 A | 9/2014 |
| CN | 105723600 A | 6/2016 |
| TW | M446455 U1 | 2/2013 |
| TW | 201417483 A | 5/2014 |
| TW | 201541235 A | 11/2015 |
| TW | 201624904 A | 7/2016 |
| TW | 201712350 A | 4/2017 |
| WO | WO 2016/194626 A1 | 12/2016 |

\* cited by examiner

HIGH EFFICIENCY CONVERTER

CROSS REFERENCE TO RELATED APPLICATIONS

This application claims priority to and the benefit of U.S. Provisional Patent Application Ser. No. 62/561,222, filed on Sep. 21, 2017 and entitled "High Efficiency Converter," which is hereby incorporated herein by reference in its entirety.

TECHNICAL FIELD

The present invention relates to power converters, and in particular to power converters with high efficiency and fast transient performance in different loading conditions.

BACKGROUND

A converter converts one voltage level (e.g., an input voltage Vin) to another voltage level (e.g., an output voltage Vout). A multi-phase converter includes several inductors coupled to an output node of the converter. The number of inductors is determined according to the loading condition of the converter. A converting efficiency is determined by a ratio of an output power to a total power including the output power and power losses, e.g., conduction loss, switching loss and driving loss.

SUMMARY

Power converters with high efficiency and fast transient performance are provided.

Some embodiments relate to a power converter for generating an output voltage at an output node, the converter comprising a first conversion path configured to generate the output voltage at the output node for a first loading condition, a second conversion path configured to generate the output voltage at the output node for a second loading condition different from the first loading condition, and an inductor coupled to the first and second conversion paths.

In some embodiments, the output voltage at the output node may be lower than an input voltage to the first or second conversion path.

In some embodiments, the first and second conversion paths may be connected in parallel between an input voltage and the inductor, the input voltage being higher than a target output voltage at the output node.

In some embodiments, the second conversion path may include a DC-to-DC converter. The first loading condition may be heavier or faster than the second loading condition.

In some embodiments, the DC-to-DC converter may be a switched capacitor DC-to-DC converter.

In some embodiments, the DC-to-DC converter may be configured to have a higher power efficiency than the power converter.

In some embodiments, the first conversion path may be coupled to an input voltage. The DC-to-DC converter of the second conversion path may be coupled to the input voltage.

In some embodiments, the first conversion path may include a first transistor coupled between the input voltage and the inductor. The second conversion path may include a second transistor coupled between the DC-to-DC converter and the inductor.

In some embodiments, the first conversion path may be coupled to a first input voltage. The second conversion path may be coupled to a second input voltage lower than the first input voltage. The first loading condition may be heavier or faster than the second loading condition.

In some embodiments, the first conversion path may include a plurality of inductors coupled to the output node. The plurality of inductors may include the inductor, and a plurality of transistors coupled to the plurality of inductors, respectively.

In some embodiments, the first conversion path may include a transistor coupled between an input voltage and the inductor. The second conversion path may include two transistors connected in series and coupled between the input voltage and the inductor.

Some embodiments relate to a converter capable of generating a plurality of output voltages at an output node. The converter may comprise a first conversion path to generate a first target output voltage at the output node, a second conversion path to generate a second target output voltage at the output node, and an inductor coupled to the first and second conversion paths.

In some embodiments, the second conversion path may include a DC-to-DC converter. The first target output voltage may be higher than the second target output voltage.

In some embodiments, the first conversion path may be coupled between a first input voltage and the inductor. The second conversion path may be coupled between a second input voltage and the inductor. The first target output voltage may be higher than the second target output voltage. The first input voltage may be higher than the second input voltage.

Some embodiments relate to a power management integrated circuit (PMIC) system comprising a first converter comprising a first conversion path for a first loading condition, a second conversion path for a second loading condition, and a first inductor coupled to the first and second conversion paths.

In some embodiments, the PMIC system may further comprise a second converter comprising a third conversion path for a third loading condition, a fourth conversion path for a fourth loading condition, and a second inductor coupled to the third and fourth conversion paths. The second conversion path of the first converter may include a DC-to-DC converter. The first loading condition may be heavier or faster than the second loading condition. The fourth conversion path of the second converter may include the DC-to-DC converter. The third loading condition may be heavier or faster than the fourth loading condition.

In some embodiments, the first conversion path may be coupled to an input voltage. The DC-to-DC converter may be coupled to the input voltage.

In some embodiments, the third conversion path may be coupled to the input voltage.

In some embodiments, the first conversion path may include a first plurality of inductors coupled to a first output node. The first plurality of inductors may include the first inductor, and a first plurality of transistors coupled to the first plurality of inductors, respectively.

In some embodiments, the third conversion path may include a second plurality of inductors coupled to a second output node. The second plurality of inductors may include the second inductor, and a second plurality of transistors coupled to the second plurality of inductors, respectively.

In some embodiments, the first converter may function as a multi-phase buck converter when the second conversion path is disabled.

In some embodiments, the second converter may function as a multi-phase buck converter when the fourth conversion path is disabled.

The foregoing summary is provided by way of illustration and is not intended to be limiting.

BRIEF DESCRIPTION OF DRAWINGS

In the drawings, each identical or nearly identical component that is illustrated in various figures is represented by a like numeral. For purposes of clarity, not every component may be labeled in every drawing. The accompanying drawings are not necessarily drawn to scale, with emphasis instead being placed on illustrating various aspects of the techniques and devices described herein.

DETAILED DESCRIPTION

The inventors have recognized and appreciated that a converter's efficiency may degrade when a target output voltage (Vout) becomes lower because the output power reduces while the power losses (e.g., conduction loss, switching loss and driving loss) remain similar. For example, when a mobile phone switches from an active mode to a standby mode, a converter, converting a battery voltage of the phone (e.g., 4 V), may reduce a target output voltage to a lower level (e.g., from 1.2 V to 0.6 V). A loading condition may indicate a magnitude of a load driven by the output voltage. The loading condition of the active mode may be heavier than that of the standby mode.

The converting efficiency may be improved by reducing the input voltage to suppress the power losses. However, the converter's transient response, which is limited by an inductor's current slew rate (i.e. (Vin−Vout)/L), deteriorates with the reduced input voltage.

The inventors have recognized and appreciated that a converter can have both high efficiency and fast transient response by separating conversion paths for different loading conditions. In some embodiments, a converter may have first and second conversion paths coupled to an inductor that is coupled to an output node. When the loading condition is heavy, the converter may enable the first conversion path to generate an output voltage at the output node; when the loading condition is light, the converter may enable the second conversion path to generate the output voltage. In some embodiment, a converter may have a peak efficiency higher than 85%, higher than 88%, or higher than 92%.

Figure 1:
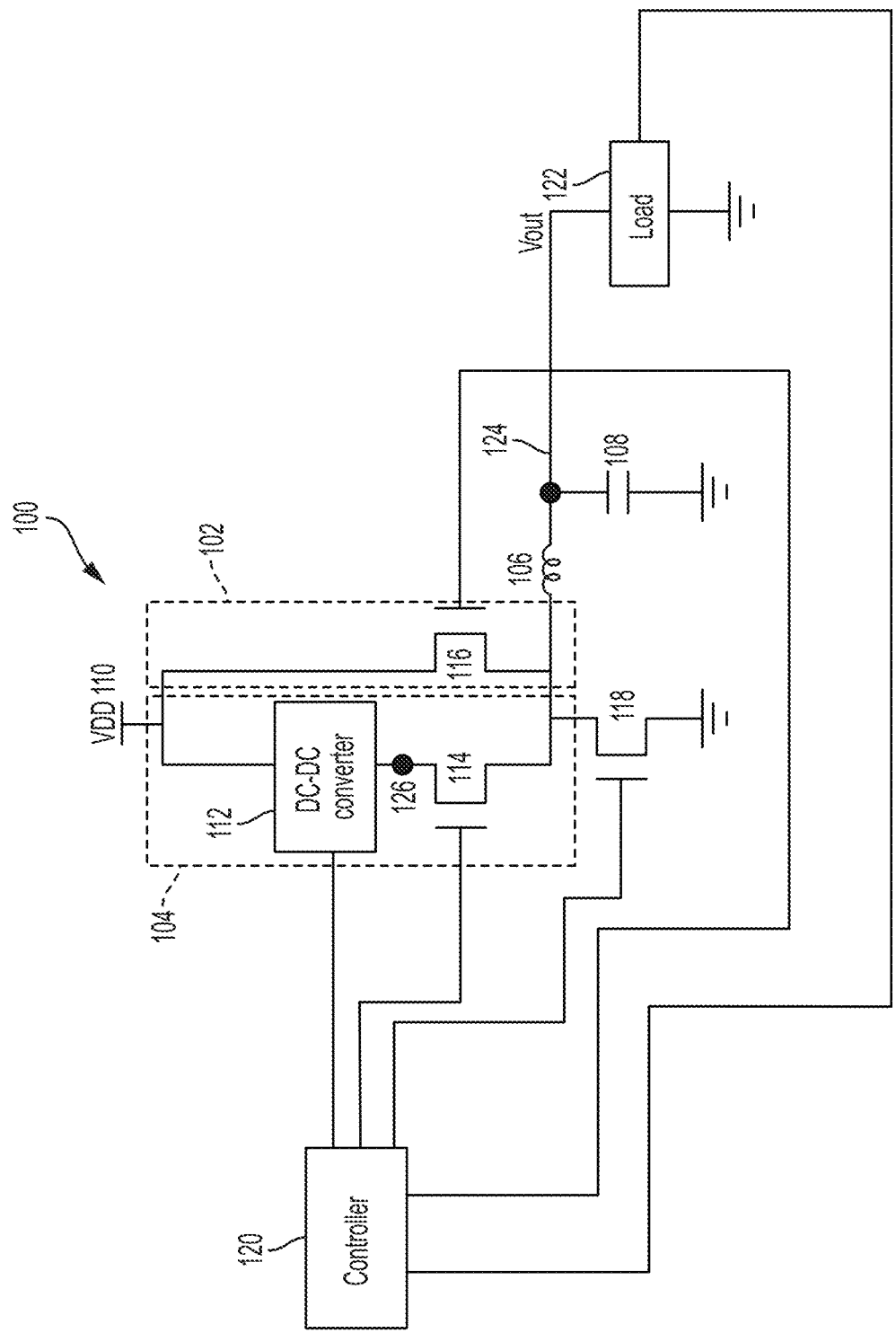
FIG. 1 is a schematic diagram illustrating a single-phase converter with a partial two-stage architecture, according to some embodiments.

FIG. 1 depicts a single-phase converter 100, according to some embodiments. The converter 100 may convert an input voltage VDD 110 to an output voltage Vout at an output node 124 to drive a load 122. The value of the load 122 may change depending on, for example, an operation mode of a system driven by the output voltage Vout. The value of the load 122 may be compared to at least one threshold voltage in order to determine the load 122 is heavy or light. For example, the output voltage Vout may drive a smartphone, which may operate in an active mode corresponding to a heavy loading condition, or a standby mode corresponding to a light loading condition. The input voltage VDD 110 may be supplied by the smartphone's battery. The target output voltage Vout may be at different levels for different loading conditions. For example, the smartphone operating in the active mode may require a higher output voltage from the converter than operating in the standby mode.

The converter 100 may include a first conversion path 102 and a second conversion path 104. The first and second conversion paths 102, 104 may be coupled to an inductor 106 that is coupled to the output node 124. The first and second conversion paths 102, 104 may also be coupled to a transistor 118. The converter 100 may function as a buck converter when either one of the first and second conversion paths are enabled. The converter 100 includes two conversion paths in the illustrated example, however, the present invention should not be limited to two conversion paths. A converter may include any suitable number of conversion paths, for example, to accommodate possible loading conditions.

The converter 100 may have at least one conversion path converting an input voltage directly to an output voltage, and at least one conversion path converting an input voltage to an intermediate voltage and then converting the intermediate voltage to an output voltage, which may be referred to as a partial two-stage architecture. In some embodiments, the first conversion path 102 may have a one-stage architecture, and the second conversion path 104 may have a two-stage architecture. The first conversion path 102 may include a transistor 116 coupled between the input voltage VDD 110 and the inductor 106, and convert the input voltage VDD directly to the output voltage Vout. The second conversion path 104 may include a DC-to-DC converter 112 and a transistor 114 connected in series, which are coupled between the input voltage VDD 110 and the inductor 106. The second conversion path may first convert the input voltage VDD to an intermediate voltage at a node 126 and then convert the intermediate voltage to the output voltage Vout. In some embodiments, the DC-to-DC converter 112 may have an efficiency higher than the converter 100. The DC-to-DC converter 112 may be a switched capacitor DC-to-DC converter, or a buck converter, or any suitable DC-to-DC converter.

The converter 100 may be controlled by a controller 120, which may be a control circuit or a processor programmed with instructions for controlling the conversion paths. The controller 120 may control the first and second conversion paths 102, 104 to be enabled or disabled depending on a loading condition of the load 122, for example, heavy or light. The first and second conversion paths 102, 104 may be enabled or disabled by turning on or off transistors 116 and 114, respectively. In some embodiments, transistors 116 and 114 may be power field effect transistors (FETs).

The inventors have recognized and appreciated that, when the loading condition is heavy, conduction loss, which is proportional to a transistor's on-state resistance ($R_{ds,on}$), dominates the power losses. Converting an input voltage directly to an output voltage produces the highest efficiency because $R_{ds,on}$ can be reduced by increasing the transistor's gate-to-source voltage ($V_{gs}$). On the other hand, switching loss, which is proportional to the square of the transistor's drain-to-source voltage (i.e. $V_{ds}^2$), becomes comparable to the conduction loss when the loading condition is light. Converting an input voltage in multiple stages can reduce the switching loss. For example that $V_{ds}$ has a value of 4, a direct conversion results a value of 16 from $4^2$ while a two-stage conversion results a value of 8 from a sum of $2^2$ and $2^2$, which is half of the value of the direct conversion.

In some embodiments, when the loading condition of the load 122 is heavy, the controller 120 may enable the first conversion path 102, and disable the second conversion path 104. The first conversion path 102, the transistor 118, the inductor 106, and the output capacitor 108 may function as a buck converter. For example, when the transistor 116 is turned on, the inductor 106 and output capacitor 108 may be charged; when the transistor 116 is turned off, the inductor 106 and output capacitor 108 may supply the output voltage Vout.

In some embodiments, when the loading condition of the load 122 is light, the controller 120 may enable the second conversion path 104, and disable the first conversion path 102. The controller 120 may control an output voltage of the DC-to-DC converter 112 depending on, for example, the value of the load 122, which may be measured by a voltage or current requested by a host system (e.g., a computing system). The output voltage of the DC-to-DC converter 112 at the node 126 may be lower than the input voltage VDD 110 such that a light load efficiency may be enhanced. The output voltage of the DC-to-DC converter 112 may be a half of the input voltage VDD 110, a quarter of the input voltage VDD 100, or any suitable value.

In some embodiments, the controller 120 may control the first and second conversion paths 102, 104 to be enabled or disabled depending on a target transient response of the load 122, for example, fast or slow. In some embodiments, when the target transient response of the load 122 is fast, the controller 120 may enable the first conversion path 102, and disable the second conversion path 104. In some embodiments, when the target transient response of the load 122 is slow, the controller 120 may enable the second conversion path 104, and disable the first conversion path 102.

In some embodiments, a loading condition may indicate a magnitude of a load driven by an output voltage of a converter, and the target transient response of the load. In some embodiments, when a loading condition is light but requires the output voltage to drop more than a certain amount, for example, 2%, 3%, or more of an instant previous output voltage for another light load, for example, 0.7 V, the controller 120 may enable the first conversion path 102, and disable the second conversion path 104. In some embodiments, when a loading condition is light but requires an output current at the output node to increase within a certain amount of time, for example, increasing from 0 A to 1 A within 0.1 ms by the inductor 106 of 1 μH, the controller 120 may enable the first conversion path 102, and disable the second conversion path 104. On the other hand, when the load can accept the required output current to be provided within a longer time, for example, 5 ms, the controller 120 may enable the second conversion path 104, and disable the second conversion path 102 for a higher efficiency.

Figure 2:
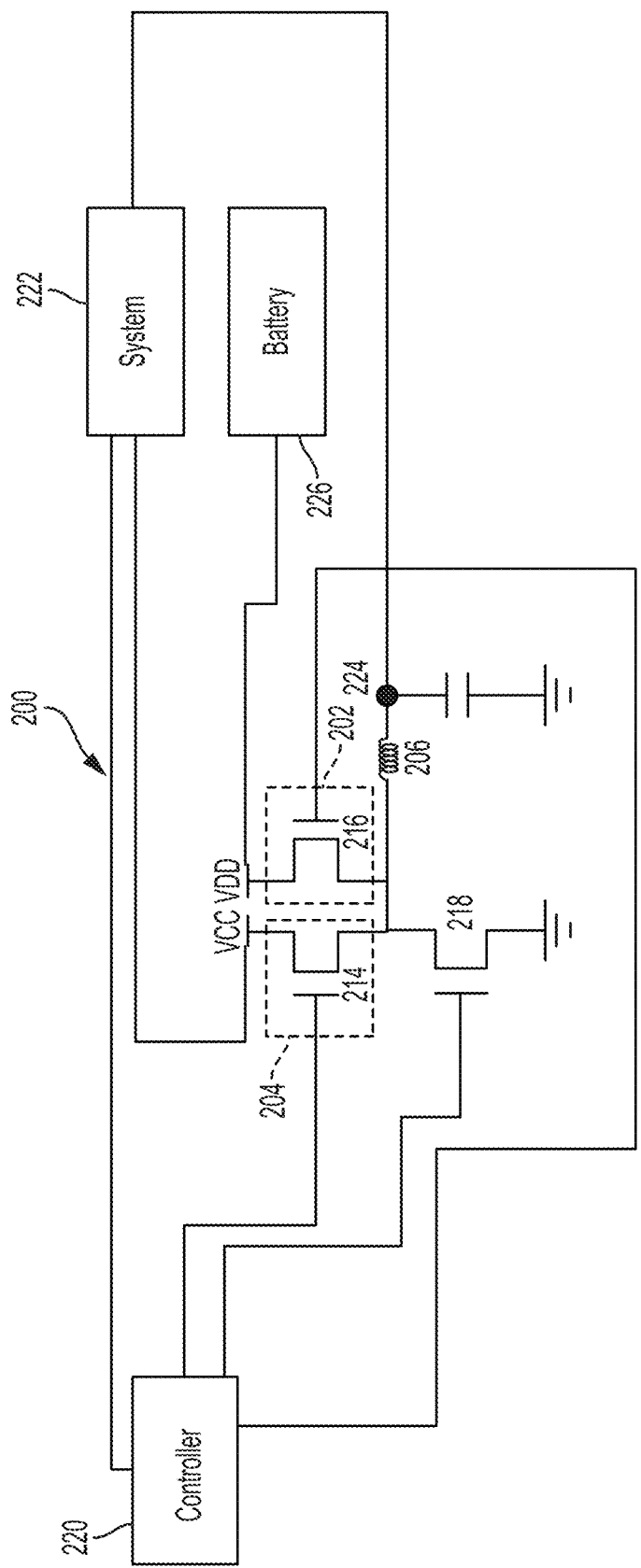
FIG. 2 is a schematic diagram illustrating a single-phase converter, which may convert different input voltages via corresponding paths for heavy and light loading conditions, respectively, according to some embodiments.

In some embodiments, a converter may have different input voltages for different conversion paths. FIG. 2 depicts an exemplary embodiment of a single-phase converter 200, which may have a first conversion path 202 and a second conversion path 204. Similar to the first and second conversion paths 102, 104 of the converter 100, the first and second conversion paths 202, 204 may be coupled to an inductor 206 that is coupled to an output node 224. The first and second conversion paths 202, 204 may also be coupled to a transistor 218.

The first and second conversion paths 202, 204 may be coupled to a first input voltage VDD and a second input voltage VCC, respectively. The first input voltage VDD may be supplied by a battery 226. The second input voltage VCC may be from an internal node of a system 222 driven by the converter 200. The second input voltage VCC may be lower than the first input voltage VDD.

The first and second conversion paths 202, 204 may include transistors 216, 214, respectively. The converter 200 may be controlled by a controller 220, which may control the first and second conversion paths 202, 204 to be enabled or disabled depending on, for example, an operation mode of the system 222.

In some embodiments, when the system 222 operates in a heavy load mode, the controller 200 may enable the first conversion path 202, and disable the second conversion path 204. Accordingly, the converter 200 may convert the first input voltage VDD to a first target output voltage at the output node 224 for the heavy load mode.

In some embodiments, when the system 222 operates in a light load mode, the controller 200 may disable the first conversion path 202, and enable the second conversion path 204. Accordingly, the converter 200 may convert the second input voltage VCC to a second target output voltage at the output node 224 for the light load mode. Accordingly, the converter's light load efficiency may be enhanced although the second target output voltage is lower than the first target output voltage.

Figure 3:
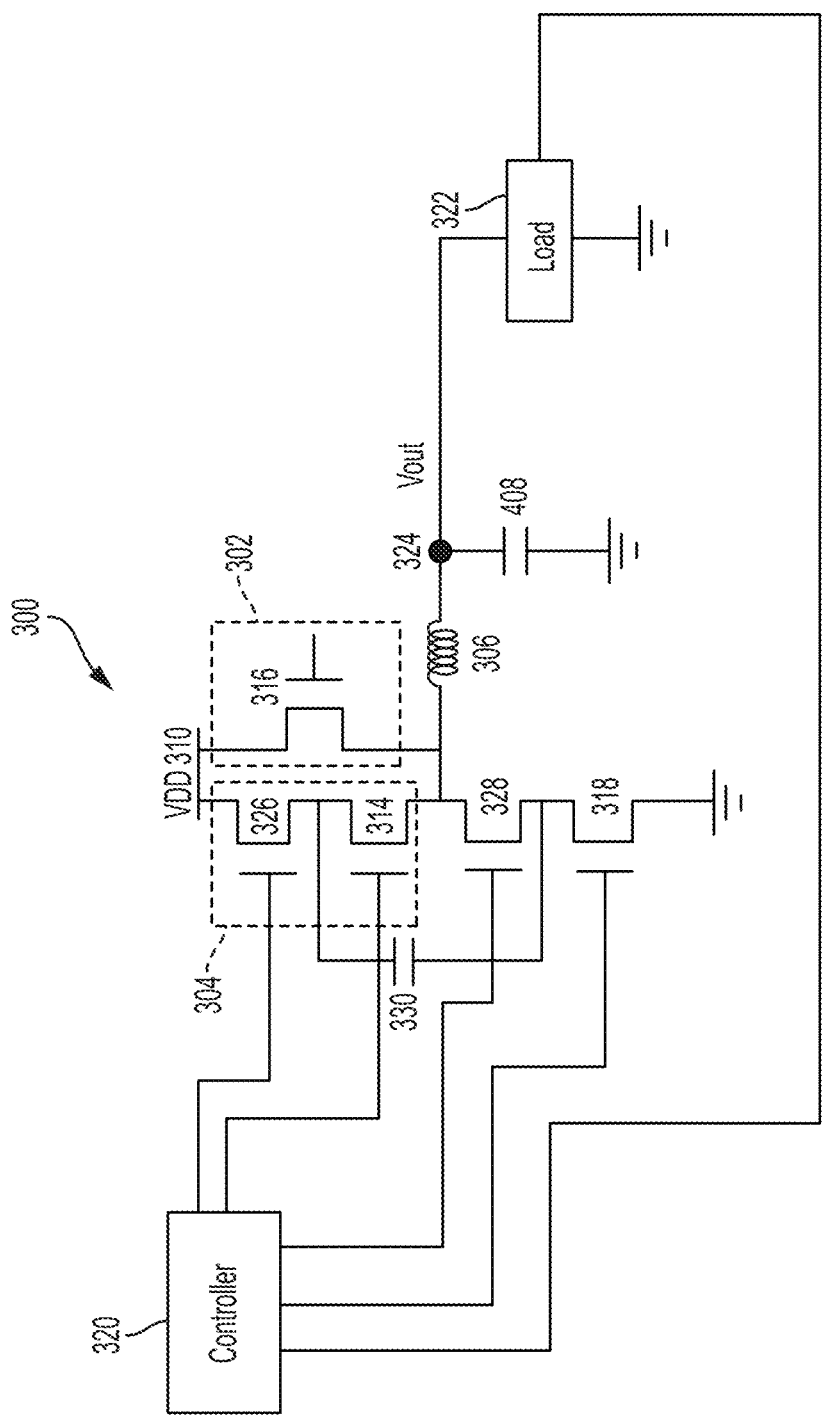
FIG. 3 is a schematic diagram illustrating a single-phase converter, which may convert one input voltage via separate paths for heavy and light loading conditions, respectively, according to some embodiments.

FIG. 3 depicts an exemplary embodiment of a single-phase converter 300, which may convert one input voltage VDD 310 via separate conversion paths 302, 304 for heavy and light loading conditions, respectively. The converter 300 may convert the input voltage VDD 310 to an output voltage Vout at an output node 324 to drive a load 322. First and second conversion paths 302, 304 may be coupled to an inductor 306 that is coupled to the output node 324. The first and second conversion paths 302, 304 may also be coupled to transistors 318, 328 connected in series. The first conversion path 302 may include a transistor 316.

The second conversion path 304 may include transistors 314, 326 connected in series. The converter 300 may also include a flying capacitor 330 coupled in between transistors 326 and 318. In some embodiments, the transistors 314 and 326 may be driven 180 degrees out of phase. The flying capacitor 330 may repeat charging and discharging each switching period. The flying capacitor 330, while being discharged, may act as a second source in addition to a capacitor 408.

The converter 300 may be controlled by a controller 320, which may control the first and second conversion paths 302, 304 to be enabled or disabled depending on a loading condition of the load 322. In some embodiments, when the loading condition of the load 322 is heavy, the controller 320 may enable the first conversion path 302, and disable the second conversion path 304. Then the converter 300 may function as a buck converter for fast transient performance. On the other hand, when the loading condition of the load 322 is light, the controller 320 may enable the second conversion path 304, and disable the first conversion path 302. Then the converter 300 may function as a 3-level buck converter for high light load efficiency.

Figure 4:
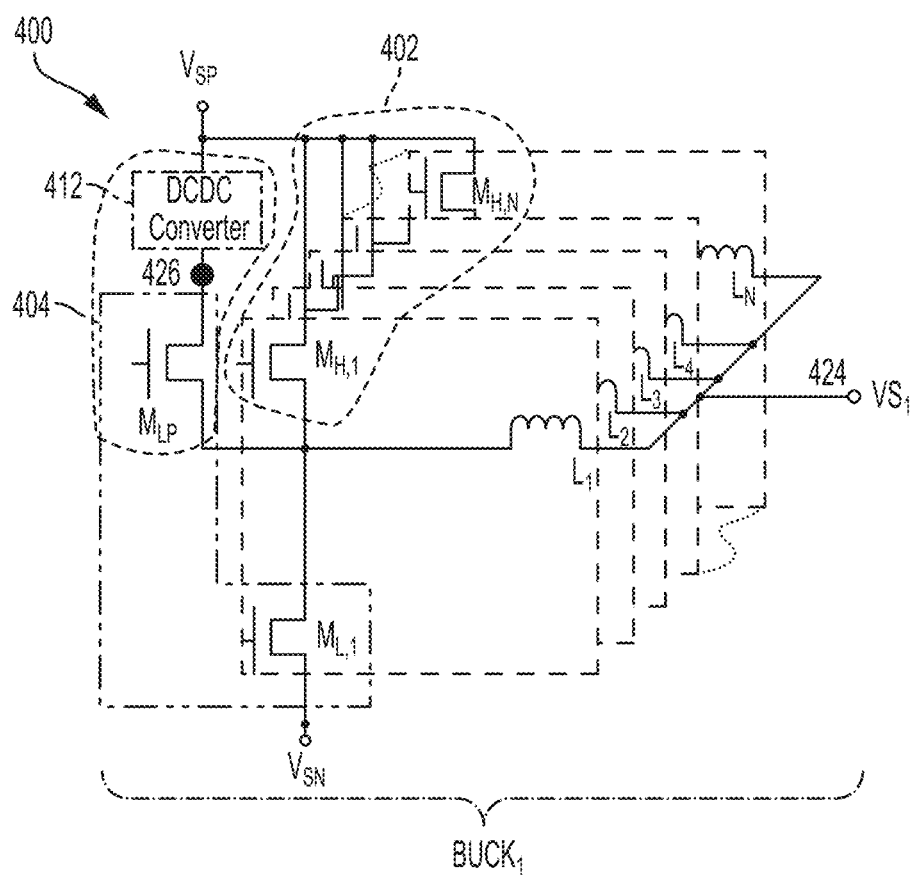
FIG. 4 is a schematic diagram illustrating a multi-phase converter, according to some embodiments.

FIG. 4 depicts a multi-phase converter 400, according to some embodiments. The converter 400 may convert an input voltage $V_{SP}$ to an output voltage $VS_1$ at an output node 424 to drive a load (not shown). The converter 400 may include a first conversion path 402 and a second conversion path 404. A controller (not shown, e.g., controller 120) may control the first and second conversion paths 402, 404 to be enabled or disabled depending on a loading condition of the load.

In some embodiments, when the loading condition is heavy, the input voltage $V_{SP}$ may be converted to a first target output voltage through the first conversion path 402. The first conversion path 402 may include a plurality of transistors $M_{H,1}, \ldots M_{H,N}$ coupled to the input voltage $V_{SP}$. The first conversion path 402 may include a plurality of inductors $L_1, \ldots L_N$ coupled to the output node 424, and also coupled to the plurality of transistors $M_{H,1}, \ldots M_{H,N}$, respectively. The first conversion path 402 and a transistor $M_{L,1}$ may function as a multi-phase buck converter.

In some embodiments, when the loading condition is light, the input voltage $V_{SP}$ may be converted to a second target output voltage through the second conversion path 404. The second conversion path 404 may include a DC-to-DC converter 412 connected to a transistor $M_{LP}$ in series. The output voltage of the DC-to-DC converter 412 at node 426 may be lower than the input voltage $V_{SP}$. Accordingly, although the second target output voltage may be lower than the first target output voltage, the converter 400 may have high efficiency under both high and light loading conditions.

Figure 5:
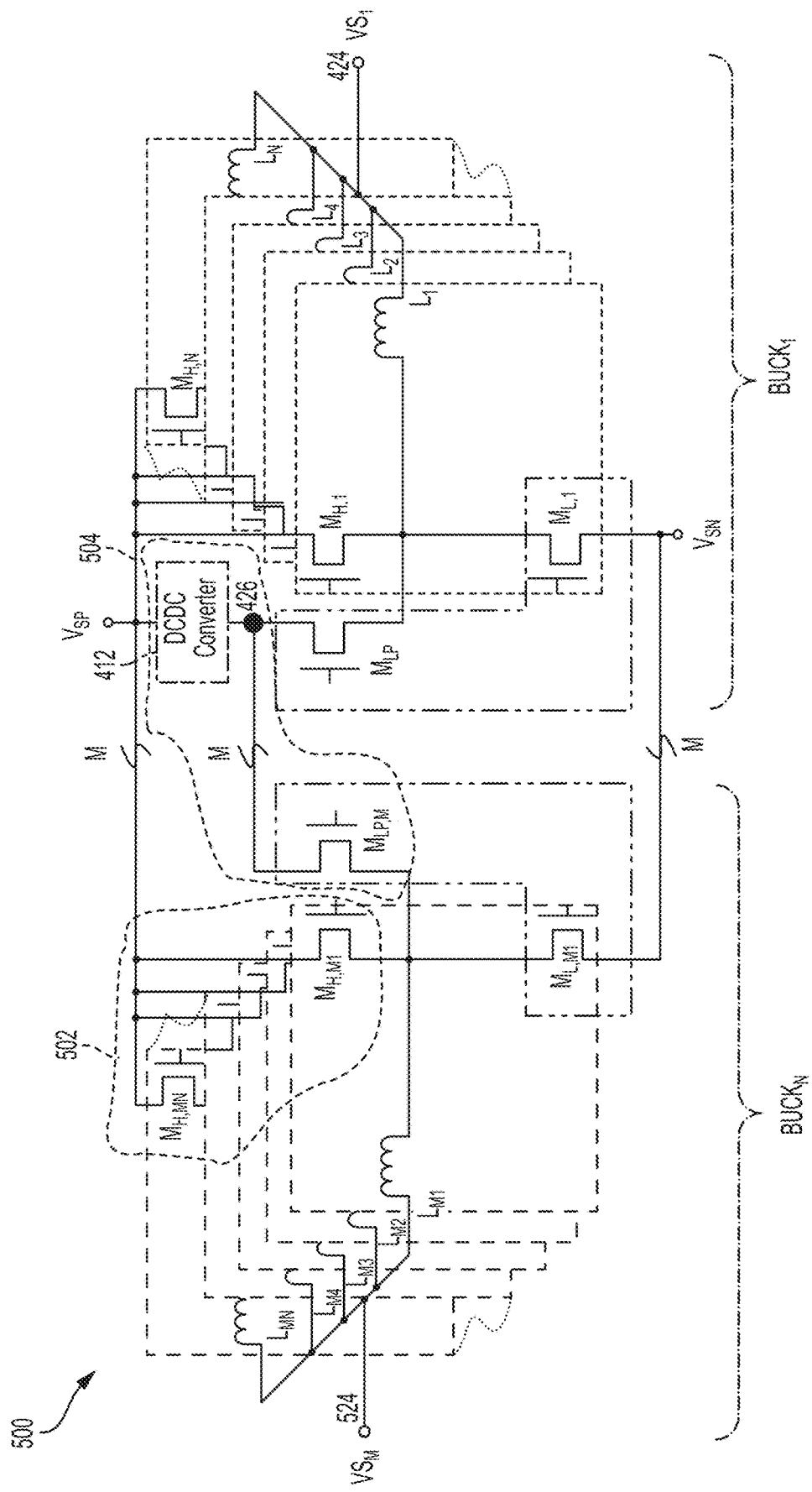
FIG. 5 is a schematic diagram illustrating a power management integrated circuit having multiple outputs, according to some embodiments.

FIG. 5 depicts a schematic diagram of a power management integrated circuit (PMIC) 500 having multiple outputs, according to some embodiments. The PMIC 500 may include a first converter $BUCK_1$ having the first output node 424, and a second converter $BUCK_N$ converting the input voltage $V_{SP}$ to an output voltage $V_{SM}$ at a second output node 524. In some embodiment, the first converter $BUCK_1$ may have some or all of the characteristics of the converter 400. Although the PMIC 500 includes two output nodes in the illustrated example, a PMIC may include three, four, or any suitable number of output nodes.

The second converter $BUCK_N$ may have two conversion paths 502, 504. In some embodiments, the second converter $BUCK_N$ may have some or all of the characteristics of the converter 400. In some embodiments, the conversion path 502 may include a plurality of transistors $M_{H,M1}, \ldots M_{H,MN}$ coupled to the input voltage $V_{SP}$. The conversion path 502 may include a plurality of inductors $L_{M1}, \ldots L_{MN}$ coupled to the output node 524, and also coupled to the plurality of transistors $M_{H,M1}, \ldots M_{H,MN}$, respectively. When the loading condition at the second output node 524 is heavy, the input voltage $V_{SP}$ may be converted through the conversion path 502. Accordingly, the conversion path 502 and a transistor $M_{L,M1}$ may function as a multi-phase buck converter.

In some embodiments, the second conversion path 504 may include the DC-to-DC converter 412 connected to a transistor $M_{LP,M}$ in series. When the loading condition at the second output node 524 is light, the input voltage $V_{SP}$ may be converted through the conversion path 504. Accordingly, the second converter $BUCK_N$ may function as a buck converter.

Figure 6:
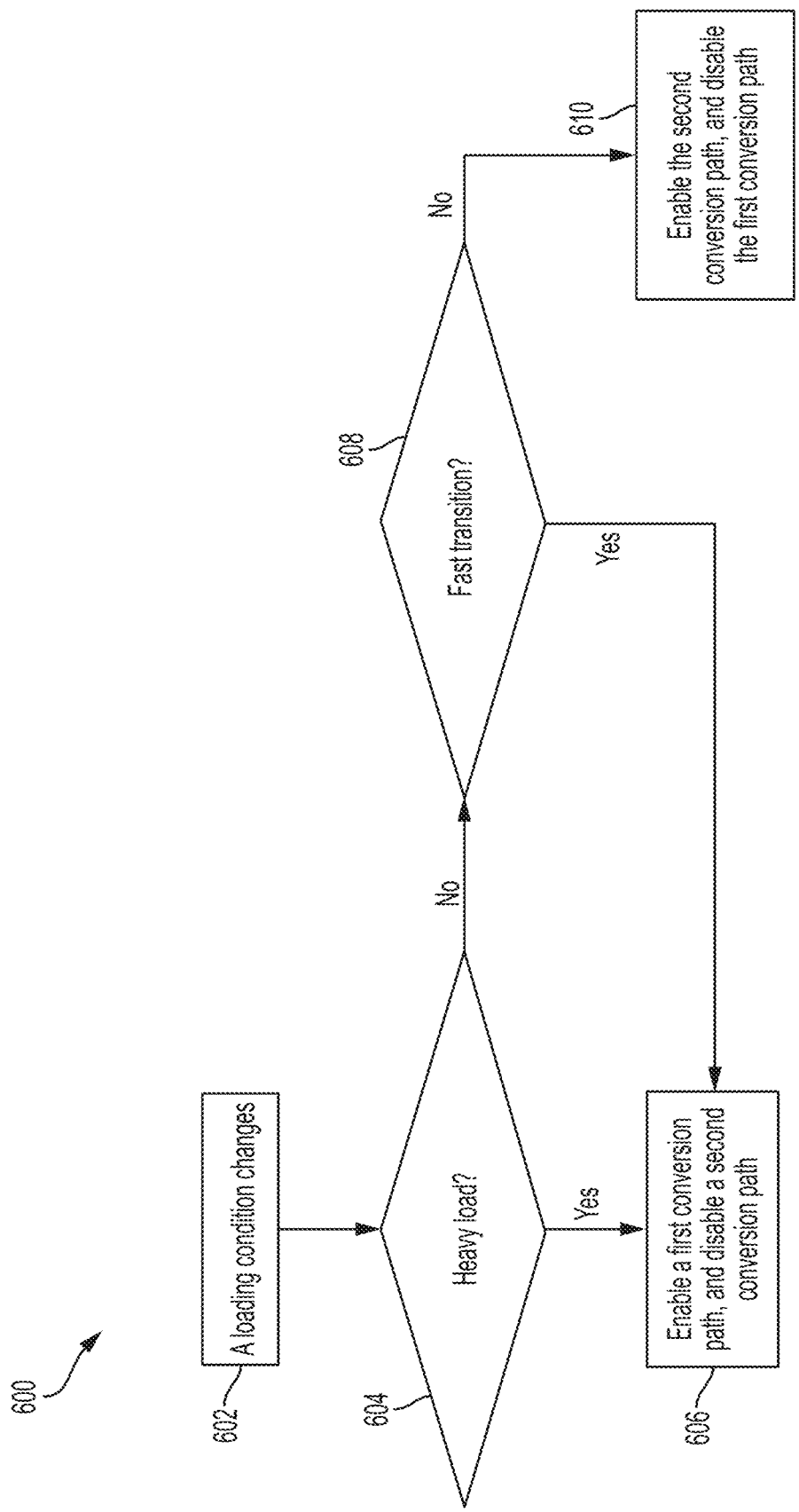
FIG. 6 is a flow chart illustrating a method to generate an output voltage at an output node of a converter, according to some embodiments.

FIG. 6 depicts a method 600 to generate an output voltage at an output node of a converter, for example, converter 100, 200, 300, 400, or 500. The method 600 may start from step 602 when a loading condition changes. The method 600 may include determining (step 604) a magnitude of a load by, for example, comparing a target output voltage of the load or a target output current of the load with a threshold voltage/current. When the magnitude of the load is determined to be heavy, the method 600 may include enabling (step 606) a first conversion path (e.g., conversion path 102, 202, 302, 402, or 502), and disabling a second conversion path (e.g., conversion path 104, 204, 304, or 404).

When the magnitude of the load is determined to be light, the method 600 may include determining (step 608) a transient speed of the load by, for example, comparing a target transient response with a threshold value. When the transient speed of the load is determined to be fast, the method 600 may include enabling (step 606) the first conversion path (e.g., conversion path 102, 202, 302, 402, or 502), and disabling the second conversion path (e.g., conversion path 104, 204, 304, or 404). When the transient speed of the load is determined to be fast, the method 600 may include enabling (step 610) the second conversion path (e.g., conversion path 104, 204, 304, or 404), and disabling the first conversion path (e.g., conversion path 102, 202, 302, 402, or 502). It should be appreciated that the steps of the method 600 should not be limited to the illustrated sequence. In some embodiments, step 608 may be performed before step 604. In some embodiments, step 600 may include only one of steps 604 and 608. In some embodiments, method 600 may include any other suitable steps.

Various aspects of the apparatus and techniques described herein may be used alone, in combination, or in a variety of arrangements not specially discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

The terms "approximately", "substantially," and "about" may be used to mean within ±20% of a target value in some embodiments, within ±10% of a target value in some embodiments, within ±5% of a target value in some embodiments, and yet within ±2% of a target value in some embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A power converter for generating an output voltage at an output node, the power converter comprising:
    a first conversion path configured to generate the output voltage at the output node for a first loading condition;
    a second conversion path configured to generate the output voltage at the output node for a second loading condition lighter than the first loading condition, the second conversion path comprising a DC-to-DC converter configured to step down a voltage, wherein
        for the first loading condition, the first conversion path is enabled and the second conversion path is disabled, for the second loading condition, the first conversion path is disabled and the second conversion path is enabled, and the DC-to-DC converter is configured to have a higher power efficiency than the power converter; and an inductor coupled to the first and second conversion paths, the inductor being between the output node and the first conversion path, the inductor also being between the output node and the second conversion path.

2. The power converter of claim 1, wherein the output voltage at the output node is lower than an input voltage to the first or second conversion path.

3. The power converter of claim 1, wherein the first and second conversion paths are connected in parallel between an input voltage and the inductor, the input voltage being higher than a target output voltage at the output node.

4. The power converter of claim 1, wherein the first loading condition is faster than the second loading condition.

5. The power converter of claim 1, wherein the DC-to-DC converter is a switched capacitor DC-to-DC converter.

6. The power converter of claim 1, wherein the DC-to-DC converter is buck converter.

7. The power converter of claim 1, wherein the first conversion path is coupled to an input voltage, and the DC-to-DC converter of the second conversion path is coupled to the input voltage.

8. The power converter of claim 7, wherein the first conversion path comprises a first transistor coupled between the input voltage and the inductor, and the second conversion path comprises a second transistor coupled between the DC-to-DC converter and the inductor.

9. The power converter of claim 1, wherein the second conversion path comprises a second stage configured to further step down an output voltage of the DC-to-DC converter.

10. The power converter of claim 1, wherein the first conversion path comprises a plurality of inductors coupled to the output node, the plurality of inductors comprising the inductor, and a plurality of transistors coupled to the plurality of inductors, respectively.

11. The power converter of claim 1, wherein the first conversion path comprises a transistor coupled between an input voltage and the inductor, and the second conversion path comprises the DC-to-DC converter and a transistor connected in series and coupled between the input voltage and the inductor.

12. A converter capable of generating a plurality of output voltages at an output node, the converter comprising:
a first conversion path configured to generate a first target output voltage at the output node for a first loading condition;
a second conversion path configured to generate a second target output voltage at the output node for a second loading condition lighter than the first loading condition, the second conversion path comprising a DC-to-DC converter configured to step down a voltage, wherein
for the first loading condition, the first conversion path is enabled and the second conversion path is disabled;
for the second loading condition, the first conversion path is disabled and the second conversion path is enabled; and
the DC-to-DC converter is configured to have a higher power efficiency than the converter; and an inductor coupled to the first and second conversion paths, the inductor being between the output node and the first conversion path, the inductor also being between the output node and the second conversion path.

13. The converter of claim 12, wherein the first target output voltage is higher than the second target output voltage.

14. The converter of claim 12, wherein
the first conversion path comprises a first transistor coupled between an input voltage and the inductor, and
the DC-to-DC converter of the second conversion path is coupled between the input voltage and a second transistor.

15. A power management integrated circuit (PMIC) system comprising:
a first converter comprising
a first conversion path configured to generate an output voltage at an output node for a first loading condition,
a second conversion path configured to generate the output voltage at the output node for a second loading condition lighter than the first loading condition, the second conversion path comprising a DC-to-DC converter configured to step down a voltage, wherein
for the first loading condition, the first conversion path is enabled and the second conversion path is disabled;
for the second loading condition, the first conversion path is disabled and the second conversion path is enabled; and
the DC-to-DC converter is configured to have a higher power efficiency than the first converter, and
a first inductor coupled to the first and second conversion paths, the first inductor being between the output node and the first conversion path, the first inductor also being between the output node and the second conversion path.

16. The PMIC system of claim 15, further comprising:
a second converter comprising a third conversion path for a third loading condition, a fourth conversion path for a fourth loading condition, and a second inductor coupled to the third and fourth conversion paths,
wherein the fourth conversion path of the second converter comprises the DC-to-DC converter, and the third loading condition is heavier or faster than the fourth loading condition.

17. The PMIC system of claim 16, wherein the first conversion path is coupled to an input voltage, and the DC-to-DC converter is coupled to the input voltage.

18. The PMIC system of claim 17, wherein the third conversion path is coupled to the input voltage.

19. The PMIC system of claim 16, wherein the first conversion path comprises a first plurality of inductors coupled to a first output node, the first plurality of inductors comprising the first inductor, and a first plurality of transistors coupled to the first plurality of inductors, respectively.

20. The PMIC system of claim 19, wherein the third conversion path comprises a second plurality of inductors coupled to a second output node, the second plurality of inductors comprising the second inductor, and a second plurality of transistors coupled to the second plurality of inductors, respectively.

21. The PMIC system of claim 15, wherein the first converter functions as a multi-phase buck converter when the second conversion path is disabled.

22. The PMIC system of claim 16, wherein the second converter functions as a multi-phase buck converter when the fourth conversion path is disabled.

* * * * *